May 7, 1935.  A. H. WOODWARD  2,000,550
SLEEPING CAR
Filed Aug. 5, 1932　　9 Sheets-Sheet 1

Inventor:
Arthur H. Woodward
By: Brown, Jackson, Boettcher & Dienner
Attys.

May 7, 1935.  A. H. WOODWARD  2,000,550
SLEEPING CAR
Filed Aug. 5, 1932    9 Sheets-Sheet 3
Fig. 3.
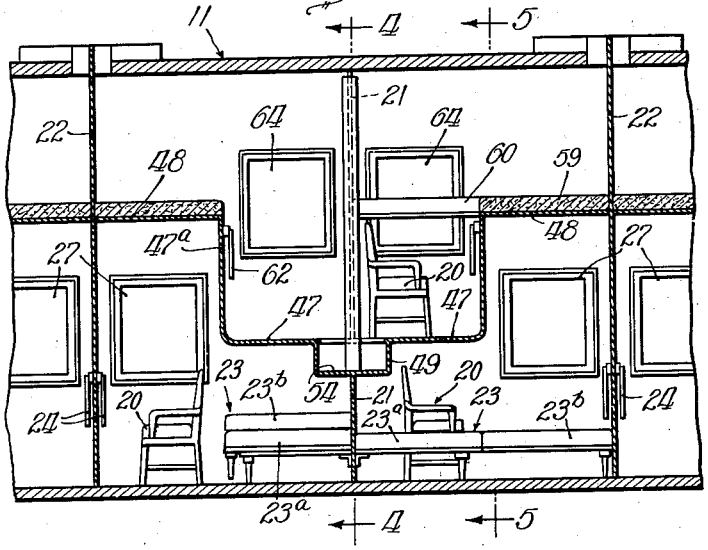
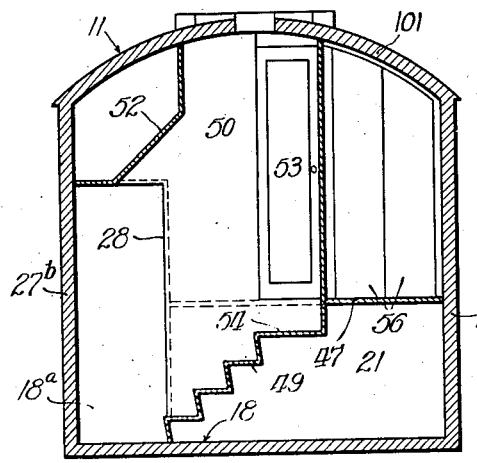
Fig. 11.
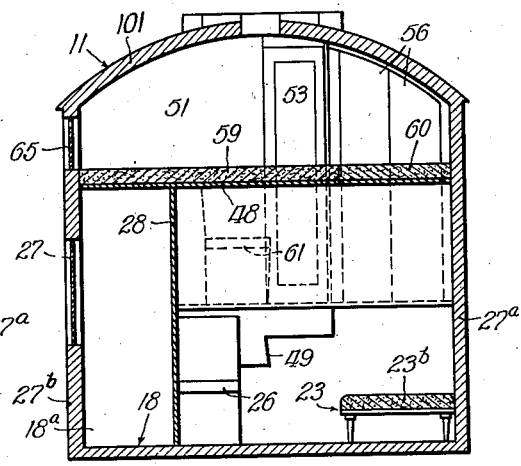
Fig. 5.
Inventor:
Arthur H. Woodward
By: Brown, Jackson,
Boettcher & Drenner
Attys.

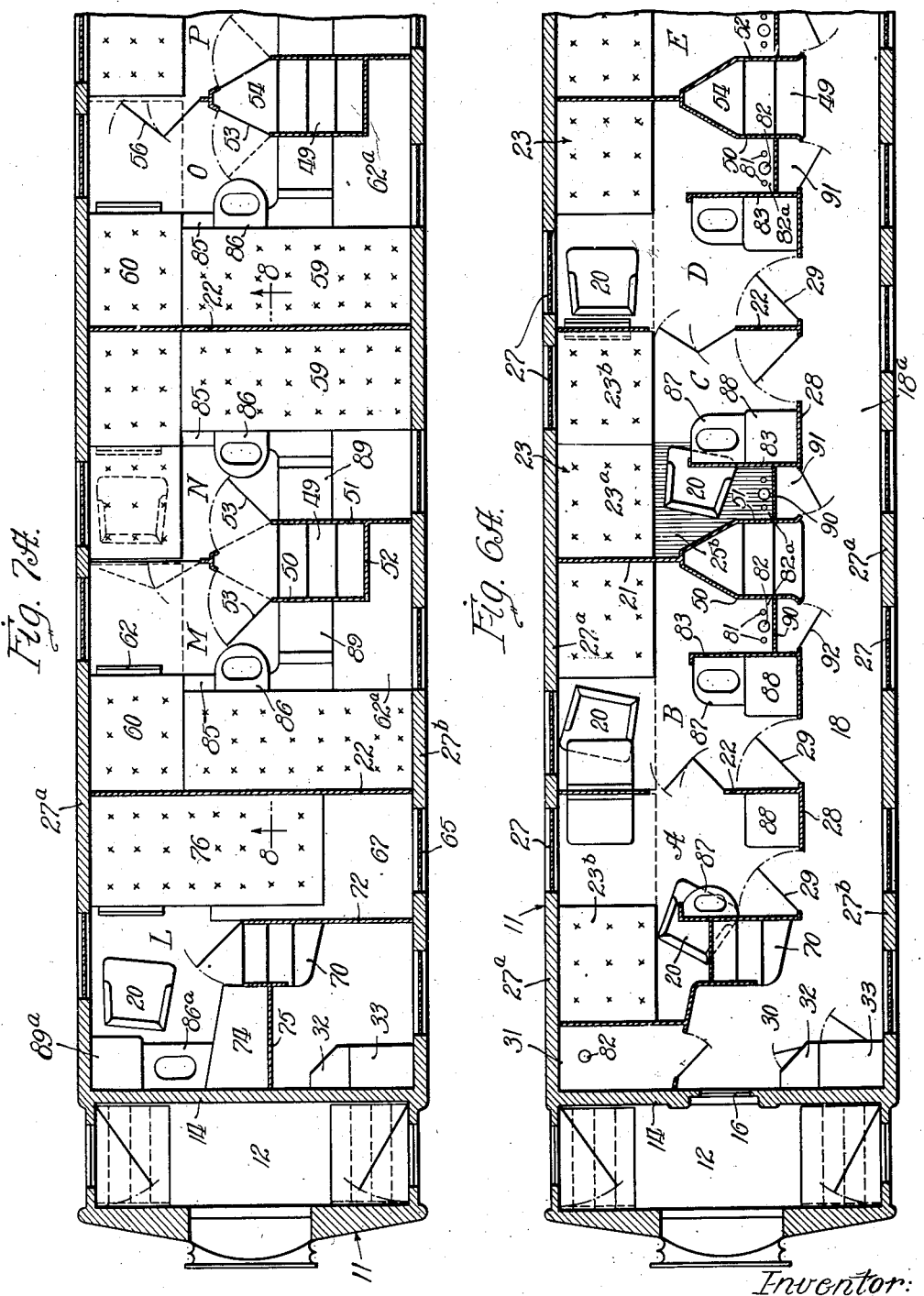

May 7, 1935.  A. H. WOODWARD  2,000,550
SLEEPING CAR
Filed Aug. 5, 1932   9 Sheets-Sheet 5
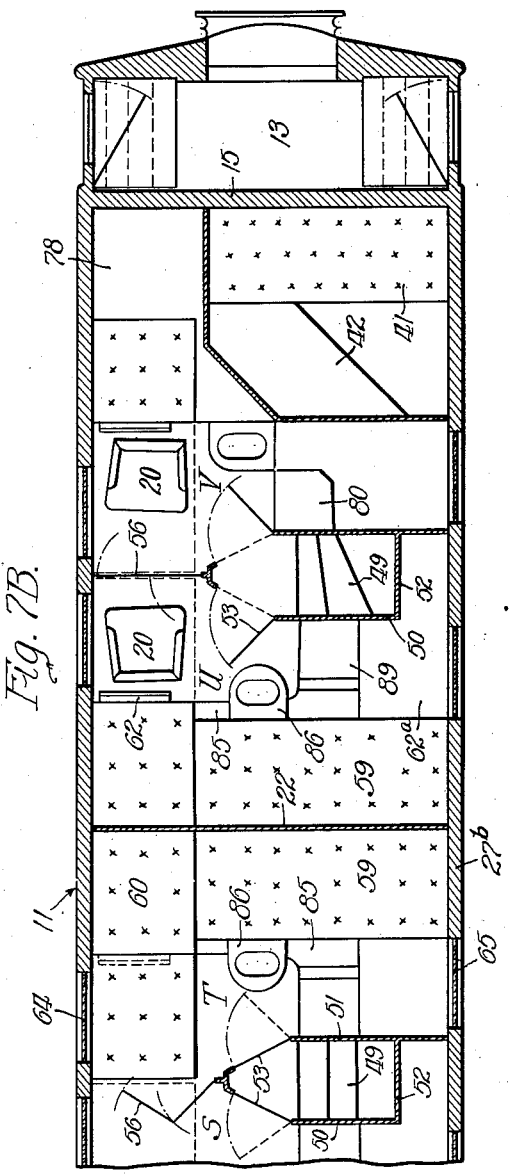
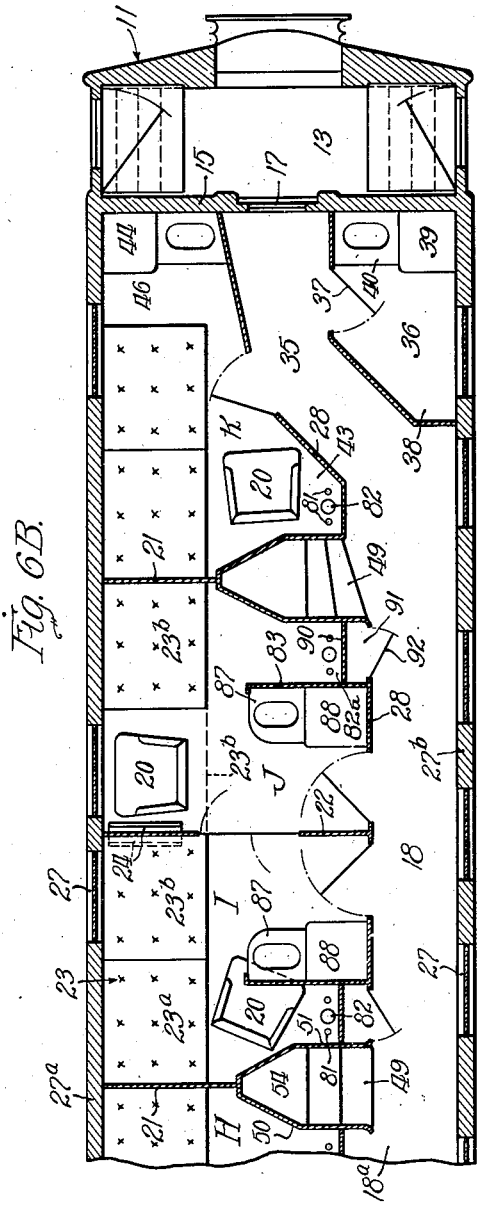
Inventor:
Arthur H. Woodward
By: Brown, Jackson, Boettcher & Dienner
Attys.

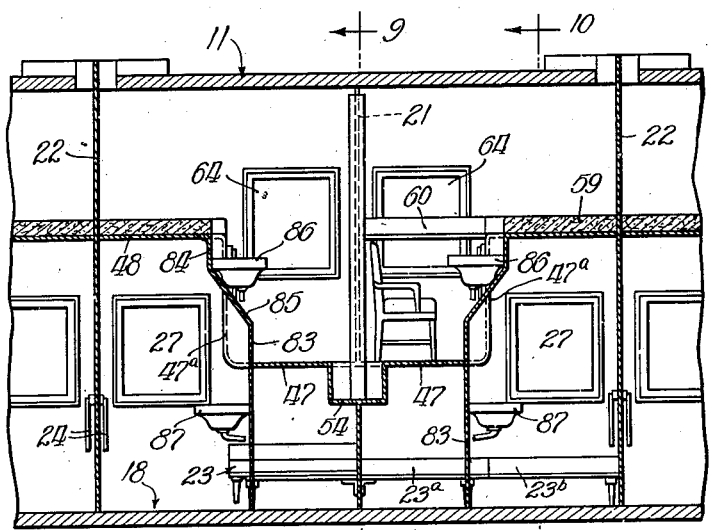
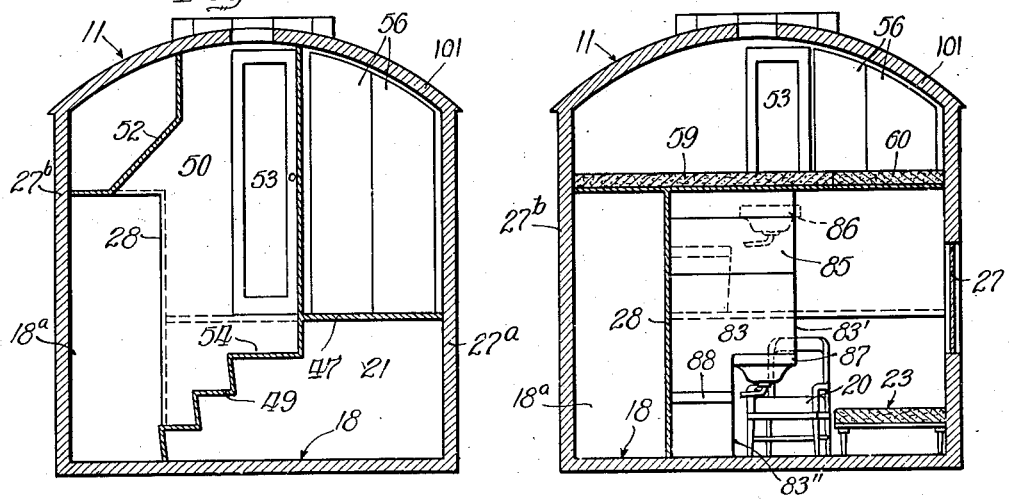
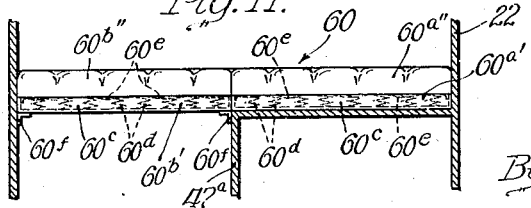

May 7, 1935.  A. H. WOODWARD  2,000,550
SLEEPING CAR
Filed Aug. 5, 1932    9 Sheets-Sheet 7
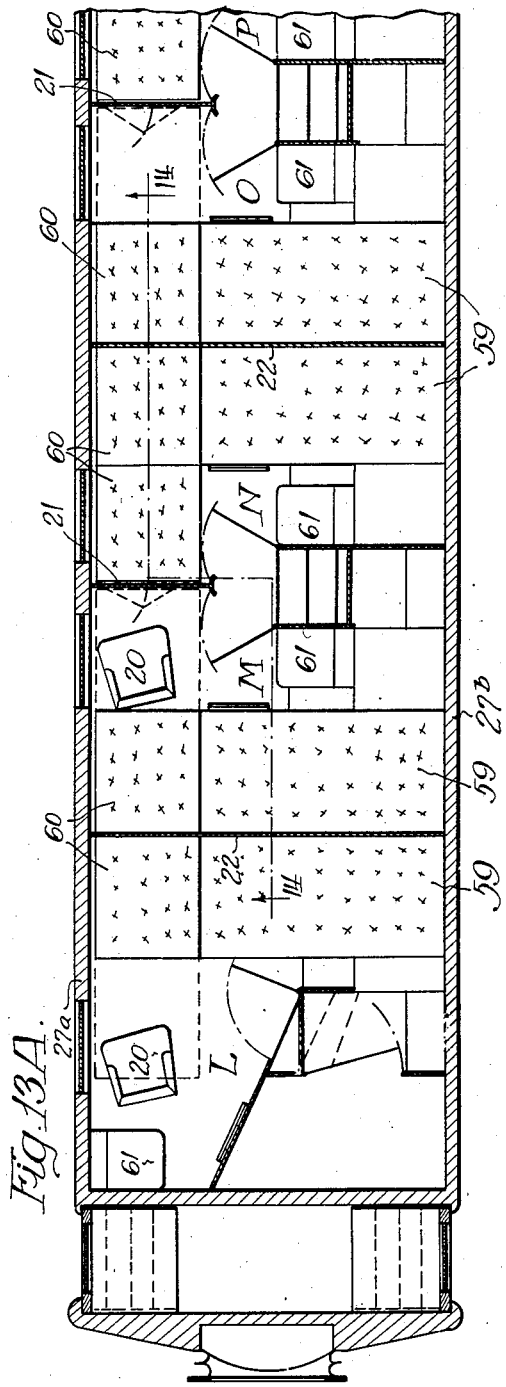
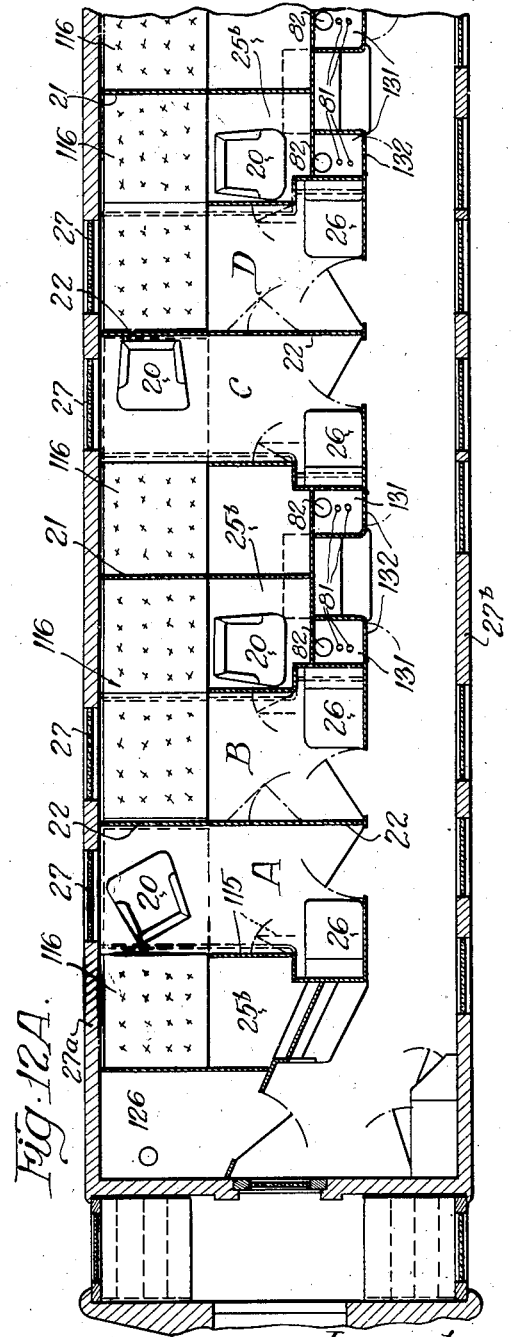

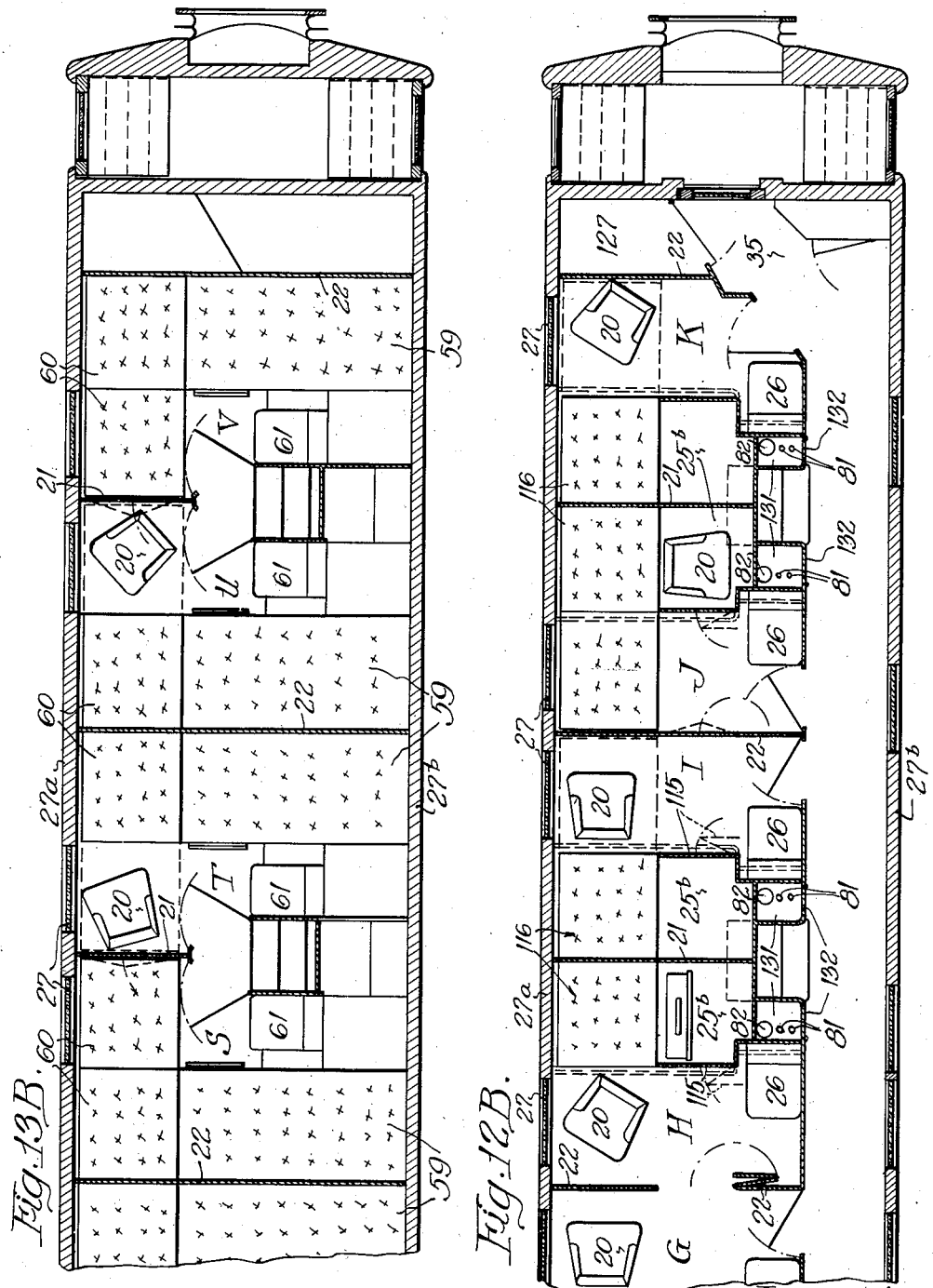

May 7, 1935. A. H. WOODWARD 2,000,550
SLEEPING CAR
Filed Aug. 5, 1932 9 Sheets-Sheet 9
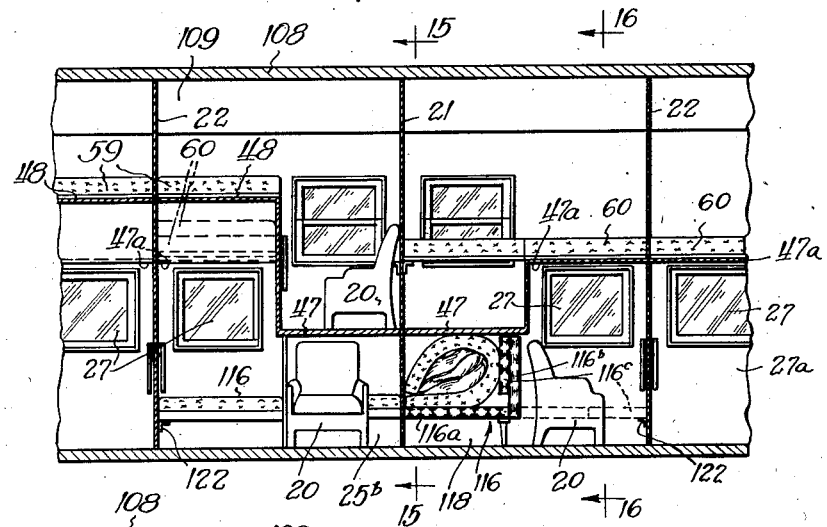
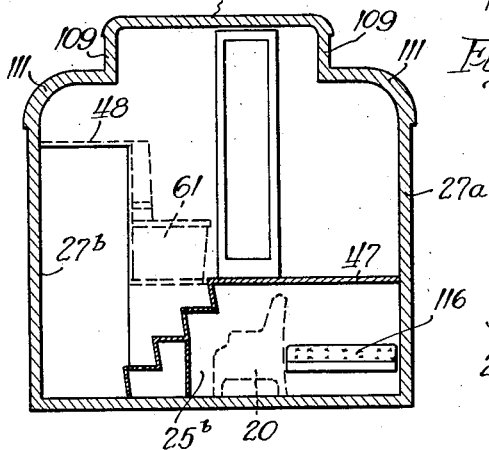
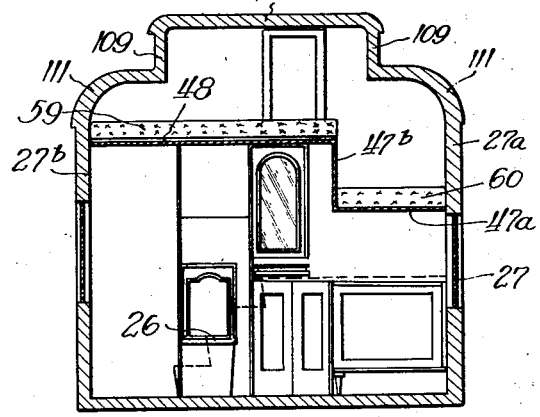
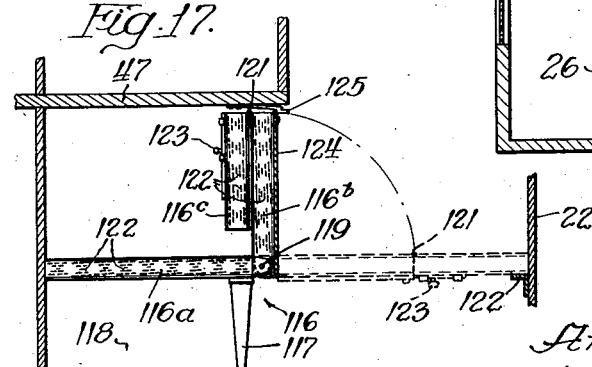
Inventor:
Arthur H. Woodward
By Brown, Jackson, Boettcher & Dienner
Attys Patented May 7, 1935

2,000,550

UNITED STATES PATENT OFFICE 2,000,550

SLEEPING CAR

Arthur H. Woodward, Winnetka, Ill.

Application August 5, 1932, Serial No. 627,563

11 Claims. (Cl. 105—315)

My invention relates to sleeping cars and its object is to provide an improved compartment car in which the passenger capacity is materially increased without increasing the overall size of the car. A further object is the provision of a generous number of individual or single rooms.

Compartment cars at present in vogue are of two general types. The older type comprises a series of compartments each of which accommodates two, and some of them three, passengers. The newer type comprises a series of individual or single compartments. In either case, the number of passengers which can be accommodated in the car is so limited that the economic waste entailed makes traveling in them expensive, and to a great extent prohibitively so.

My invention contemplates a double deck arrangement, i. e., lower and upper rooms, and by combinations of double and single rooms, and arrangement of the beds therein, I am enabled to utilize the standard allotment of space most efficiently and to accommodate a sufficient number of passengers in one car to bring travel in them within the means of the average patron of sleeping cars.

Another object is to provide, in one embodiment of the invention an improved arrangement of upper and lower compartments and associated beds, toilet facilities and standing room spaces, which can be built directly into a standard Pullman car body having the typical present day design and dimensions of roof structure. Other objects of the invention will appear in the following description.

In the drawings accompanying said description:—

Figures 1A and 1B together constitute a plan view of the lower deck, the length of the car being conveniently broken away;

Figures 2A and 2B together constitute a plan view of the upper deck, this view being in appropriate alignment with the corresponding plan of Figures 1A and 1B, in order to facilitate reading of the drawings;

Figure 3 is a section taken substantially on line 3—3 of Figure 2A;

Figure 4 is a section taken substantially on line 4—4 of Figure 3;

Figure 5 is a section taken substantially on line 5—5 of Figure 3;

Figure 1:
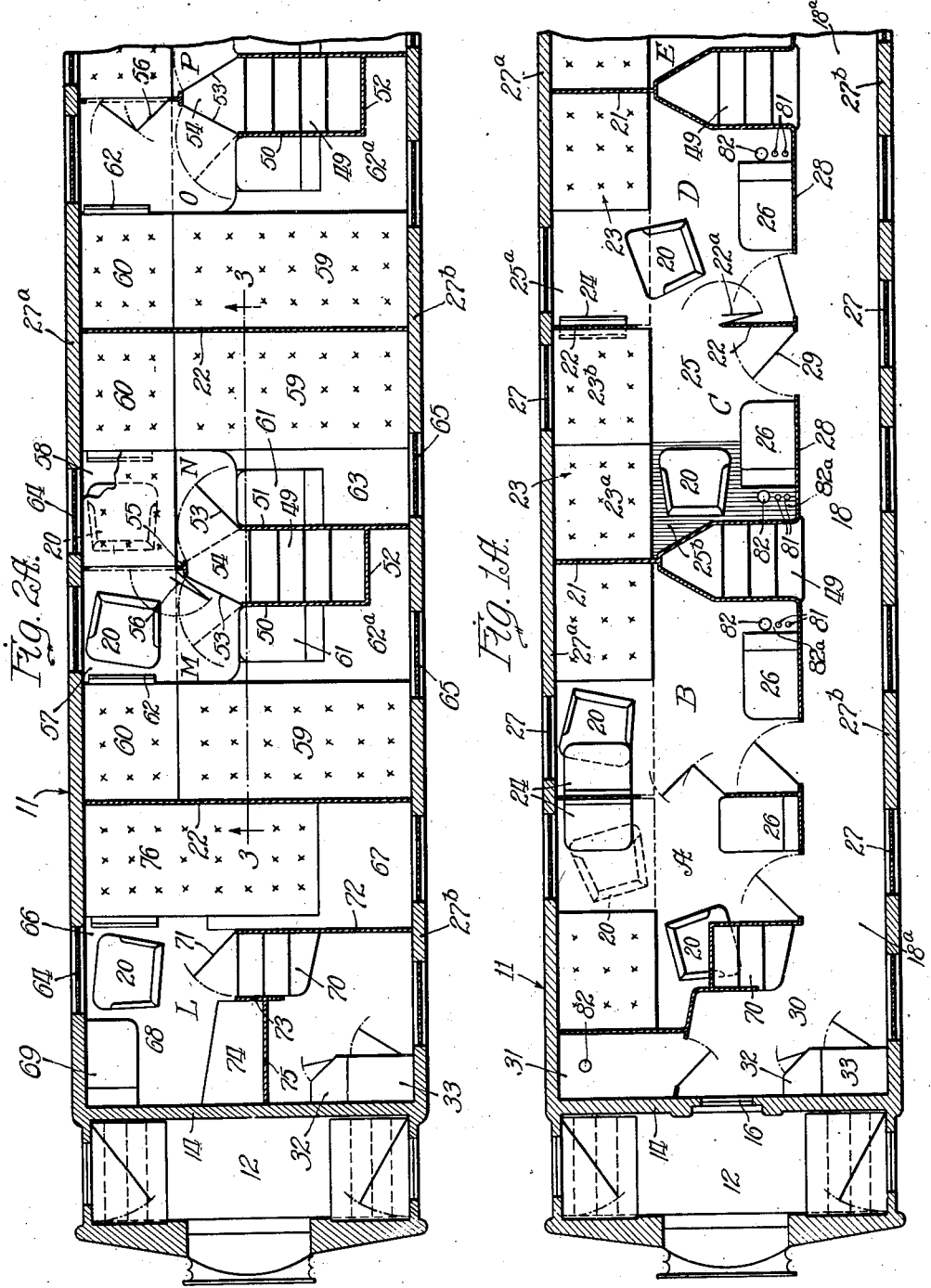
Figure 2:
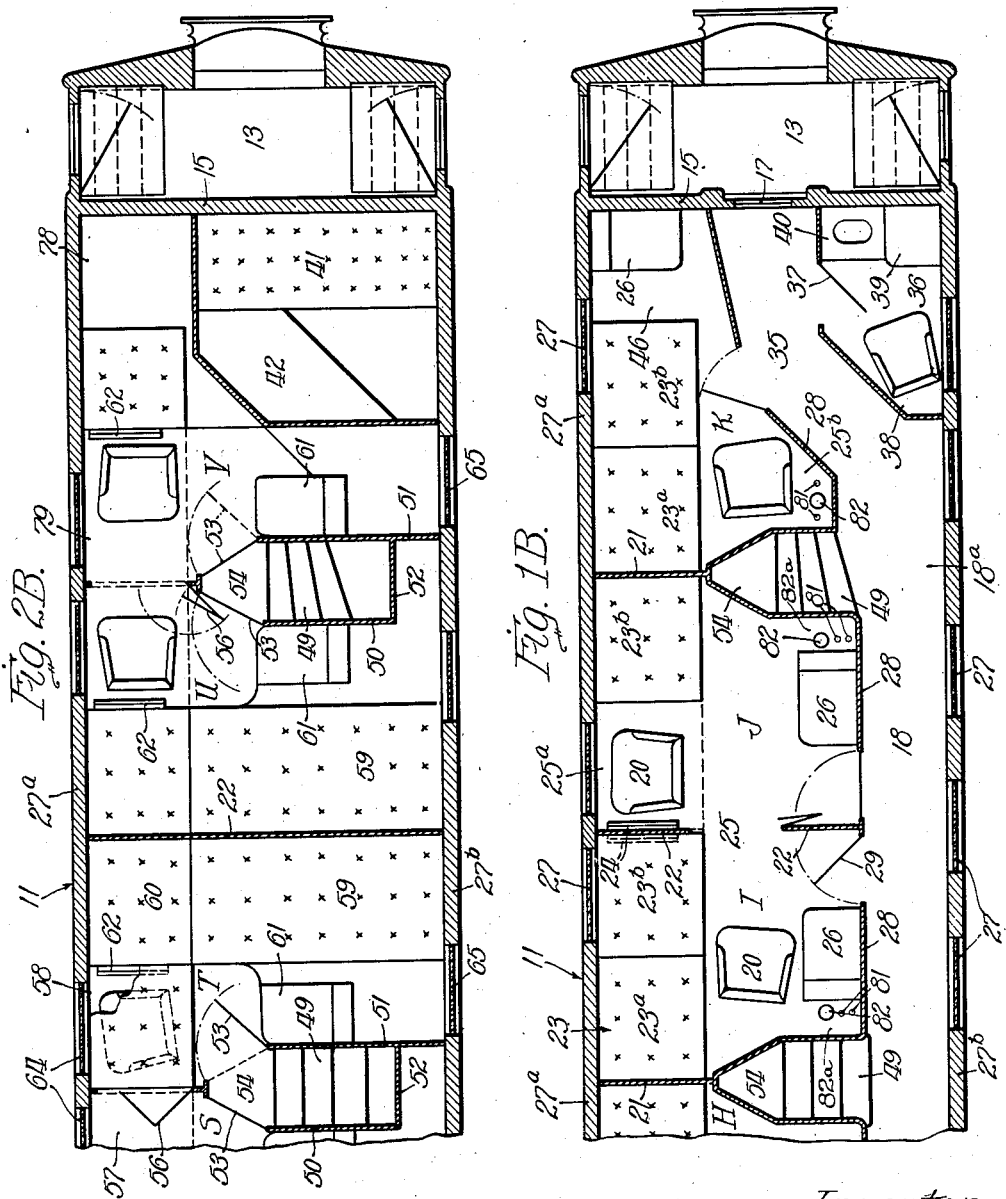

Figures 6A and 6B, and 7A and 7B, are views similar to Figures 1A and 1B, and 2A and 2B, respectively, but showing a modified arrangement;

Figure 8 is a section taken substantially on line 8—8 of Figure 7A;

Figure 9 is a section taken substantially on line 9—9 of Figure 8;

Figure 10 is a section taken substantially on line 10—10 of Figure 8;

Figure 11 is a detail view of a typical construction of extensible bed which may be used in the car;

Figures 12A and 12B, and 13A and 13B are views similar to Figures 1A and 1B, and 2A and 2B, respectively, but showing another modified arrangement;

Figure 14 is a section taken substantially on line 14—14 of Figure 13A;

Figure 15 is a section taken substantially on line 15—15 of Figure 14;

Figure 16 is a section taken substantially on line 16—16 of Figure 14; and

Figure 17 is a detail view of another typical construction of extensible bed which may be used in the car.

The car, as a whole, is indicated by the reference number 11, the usual end vestibules being shown at 12 and 13, and the body of the car between the end walls 14 and 15, in which doors 16 and 17, respectively, are provided, is divided into a series of compartments and an aisle, as will now be described. The main floor or deck is indicated at 18 and the compartments on that deck are the so-called lower compartments. These lower compartments are arranged in pairs, except the two end compartments, one at each end of the car.

Running along one side of the car is the aisle 18a of small width relative to the width of the car. The lower compartments are designated from left to right, respectively, as A, B, C, D, * * * I, J, and K. With the exception of the end compartments, which will be later referred to in more detail, the other lower compartments are arranged in pairs and are of the same size and identical except that half of them are of the complements of the other half, i. e., compartment C is the complement of compartment D, and the next compartment E to the right is the same as compartment C, this arrangement of the compartments in complementary pairs extending to and including compartments I and J, which are also complements of each other. The cross dividing wall 21 is a permanent one and the cross dividing wall 22 may have in it a folding partition 22a acting as a door to permit communication between the two adjoining compartments of each pair. The bed 23 lies lengthwise of the car, at one side thereof, and crosswise of the room or compartment. The bed comprises a fixed section 23a attached to the wall 21, and a movable section 23b which, when extended, is aligned with the fixed section, the two sections of the bed spanning the space between the walls 21 and 22. When the bed is not in use (see Fig. 3), section 23b thereof is disposed in its unextended position, in which relation the leg supported frame of the movable section 23b is placed on top of the frame of the fixed section 23a and the two sections of the mattress are then placed on top of these two frame sections. The frame sections may have any suitable bed spring structures built therein. The folding or collapsing of the bed to inoperative condition leaves the floor space between section 23a of the bed and partition 21 unobstructed for reception of a chair 20 or other movable article of furniture. Conveniently, suitable shelves or leaves 24 are suitably hinged to the opposite sides of partition or wall 21 at a proper height to clear the bed, when the latter is extended, these leaves being also disposed at a proper height, when raised, to conveniently serve as a desk or table for a person seated in a chair adjacent and facing the wall 22.

The floor space of each lower compartment is indicated at 25 and, as shown, it is ample for the installation of permanent toilet facilities 26 and for the chair 20. This floor space 25 is supplemented by the floor space 25a when section 23b of the bed 23 is disposed in its unextended or inoperative position. This supplemental or additional floor space is amply sufficient to readily accommodate the chair 20 in any desired position; for example, facing either forwardly or rearwardly for either direction of travel, for writing at the folding table 24, as illustrated in compartment B, or for facing in a direction to look directly out of the window 27, as illustrated in compartment J. When the movable section 23b of the bed is moved outwardly to complete the bed structure, as illustrated in compartments C, I and K, the chair 20 must be moved from the floor space 25a to accommodate such bed section. The chair might be left in the standing space to one side of the extended bed section 23b, but this is not generally satisfactory because the chair will then obstruct the remaining area of standing room floor space 25 between the bed and the compartment door. To avoid this, my invention provides a chair storage space or compartment 25b. Compartments C, I and K illustrate the chair 20 in its chair storage space 25b, which may be defined as an extended floor space area disposed inwardly of the fixed bed section 23a, i. e., the transverse space between this fixed bed section and the toilet unit 26 or wall 28. In compartment C of Figs. 1A and 6A I have illustrated this chair storage space 25b approximately by vertical shade lines. There is no need for standing room in this storage space 25b and, as will be hereinafter described, the lower stage of the upper deck extends partly over this chair storage space 25b and over the fixed section 25a of the bed. The storage space 25b is ample to accommodate grips, suit cases and other luggage, particularly when the chair 20 is occupying sitting space 25a at the window 27, during day travel.

The toilet units 26 are preferably of the combination type, known as chair hopper and folding washstand in which the lower part is a water closet concealed in a chair and the upper part has a wash bowl mounted in the back of the chair which is hinged so as to permit the wash bowl to be swung to a horizontal position for use and to a vertical position when not in use. These combination toilet units 26 in the lower compartments are preferably disposed along the inner side of the lengthwise dividing wall 28 which separates the aisle 18 from the lower compartments. The windows 27 are appropriately placed in the side walls 27a, 27b of the car, those on one side being arranged in pairs with the windows of each pair adjacent to and at opposite sides of each transverse partition wall 22, as shown, to light the floor space and above the bed, and those on the other side lighting the aisle. Solely for convenience of reference, the wall 27a will be referred to as the left wall and the wall 27b as the right wall. The lengthwise dividing wall 28 is provided with suitable doors 29 leading to the floor space of the respective compartments. At one end of the interior of the car suitable space may be provided to afford a passage 30 from door 16 to aisle 18a, selected portions of this space being utilized as storage spaces or closets 31, 32 and 33 for storage of linen and other equipment. It will be noted that lower compartment A at this end of the car is shaped somewhat differently than the compartments B, C, D, etc., due to the provision of passage 30, and is provided with a combination toilet unit 26 in the corner between the lengthwise wall 28 and the cross partition 22. The chair storage space 25b is somewhat smaller, extending partly under the stairs 70, but is ample to accommodate the chair 20. Otherwise the arrangement of this compartment is similar to that of compartments B, C, D, etc., and need not be described in detail.

At the other end of the car an inclined and angular passage 35 gives access to aisle 18a through door 17. A porter's room 36 is provided at one side of this passage, to which room access is had by means of a door 37. This room includes floor space 38 of proper area to accommodate suitable movable furniture, and toilet facilities 39—40 disposed adjacent end wall 15. A suitable bed 41 overlies the toilet facilities 39 and 40, the inner end portion of this bed overlying the passage 35. By reference to Figure 2B, it will be noted that the upper portion of the porter's room 36 is extended inwardly so as to overlie the passage 35, the space of this room which overlies the passage 35 and is not occupied by bed 41 constituting a storage space 42. The bed 41 may be reached by means of a suitable ladder, or in any other suitable manner. The other lower compartment K, at the other side of passage 35, is shaped to accommodate this passage and is provided with a combination toilet unit 26. This compartment has floor space 46 which is supplemented, when the bed is not extended, by the additional floor space rendered available by disposal of the movable section of the bed in its inoperative or unextended position. The arrangement of the bed, the provision of the chair storage space 25b, and other features of this compartment are, in general, similar to those of the compartments B—J and need not be described in detail.

In this form of my invention, all of the lower rooms or compartments are single rooms.

The upper rooms are designated L, M, N, O, P, * * * * S, T, U, V. With the exception of the two end rooms L and V, the upper rooms are all double rooms and they extend from side to side of the car, i. e., over the lower rooms and over the aisle. Referring to Figure 3, the upper deck is of multiple-stage construction, having the floor portions 47 and the bed portions 48, the latter portions being higher than the former portions to the extent of providing adequate height in which to stand in the compartment below. The lower stages or floor portions 47 are substantially co-extensive with the fixed sections 23a of the beds below and with the chair storage spaces or compartments 25b, and lie directly thereover. The upper stages or bed portions 48 overlie the lower floor portions 25 and 25a and the aisle 18a. The result is that a person may stand comfortably wherever there is floor space, or in the aisle, below and, at the same time, a person may stand comfortably wherever there is floor space above.

Access is had to the upper compartments or rooms by means of stairs 49 disposed within stair wells defined by walls 50, 51 and 52, walls 50 and 51 extending from the stairs 49 to the roof of the car, and these walls and wall 52 being suitably shaped to define, in conjunction with wall 28, the aisle 18a of appropriate width and height. The transverse partitions 21 extend beneath floor portions 47 of the upper rooms and stairs 49, this partition being located centrally of the stairs. Doors 53, conveniently hung upon the partitions 50 and 51, give access to two adjacent upper rooms from a triangularly shaped landing 54 at the top of the stairs. As clearly shown in Figures 3, 4 and 5, the stairs 49 and stair landing 54 overlie part of the chair storage space 25b. As previously remarked, this storage space may also be used to store baggage or other articles. It will also be noted that the extensible beds 23 in the lower compartments are supported on legs to give storage space beneath these beds. An upright 55, extending from the stair landing 54 to the roof of the car, cooperates with the doors 53 to effect the desired closures. A folding door 56, when extended between the upright 55 and the adjacent side 27a of the car, provides a partition separating the two adjacent upper rooms. Opening this folding door or partition establishes communication between the two rooms, as desired. Placing the chair 20 temporarily on the bed enables this door or partition to be folded inwardly. It will be noted that each pair of intercommunicating upper rooms, between which communication can be established through the folding door 56, is directly above two lower rooms which are not intercommunicating.

Referring to the complementary upper rooms M, N, O, P, etc., each of these rooms contains a bed 59 of fixed length extending parallel to and adjacent partition 22 and overlying the aisle 18a and a portion of the floor space 25 of the corresponding lower room. In this connection, the upper stages or bed portions 48 of the upper rooms extend the full width of the car, and thus overlie the supplemental floor spaces 25a of the lower rooms. Each of the rooms M, N, O, P, etc. also contains an extensible bed 60 similar to the beds of the lower rooms, the fixed sections 60a of the beds 60, which sections are mounted on the ends of the transverse upper stage portions 48 overlying the supplemental floor spaces 25a of the lower rooms. The movable sections 60b of the beds 60, when extended, span the space between the bed portion 48 and the partition formed by the folding door or partition structure 56. Figure 11 illustrates one typical construction of extensible bed 60. The fixed section 60a comprises a bed spring section 60a' and a mattress 60a'' and the movable section likewise comprises a bed spring section 60b' and a mattress 60b''. Each bed spring section 60a', 60b' is shown as comprising a frame 60c and a series of coil springs 60d. Extending across the tops of these coil springs and secured thereto are longitudinal and transverse strips of webbing 60e which are secured at their ends to the side and end members of their respective frames 60c. When the bed is extended the spring frame of the movable section is supported on small angle brackets or shoulders 60f which are provided on the side wall 27a, on the partition 56 and on the vertical wall 47a of the upper deck. The mattress sections 60a'' and 60b'' are then placed on the aligned spring frames. The abutting ends of the spring frames have no upwardly extending frame bars such as would create a hard spot under the mattress sections. When the bed is to be folded or brought back to its small dimensions, the movable spring frame 60c is placed on top of the fixed spring frame and the two mattress sections are then piled on top of these two spring frames. Preferably, the upper stage portions 48 are of such height that a chair or similar article of furniture may be disposed upon the floor portion 47 beneath the movable section 60b of the bed 60 when this section is extended, as in Figure 3. Each of the rooms 57 M, N, O, P, etc. is provided, adjacent the door 53, with combination toilet units 61 like the lower units 26 and, conveniently, a leaf or shelf 62 is suitably mounted upon vertical wall 47a of upper stage portion 48 at a suitable height for use as a desk, when raised, by a person seated in a chair upon the floor portion 47. As will be noted more clearly from Figure 2A, and Figure 5, partition or wall 51 is extended over the aisle to the adjacent side of the car. This provides a storage space 62a for compartments M, O, * * S, U, which extend from the bed 59 and over the aisle to wall 51. Compartments N, P. * T have a storage space 63 which extends from bed 59 over the aisle and to wall 51. With the exception of this difference in storage space, the rooms of each pair of upper rooms are identical as to size and shape and are complementary to each other. Each of the rooms M to U, inclusive, thus contains two beds and has floor space sufficient to accommodate toilet facilities and a chair or similar movable article of furniture. Windows 64 arranged in pairs, with the windows of each pair arranged at each side of and equidistant from the plane of the folding partition 56 when the latter is in extended or closed position, are provided in one side wall of the car and open over the floor portions 47 of the upper rooms. Relatively low windows 65 are provided in the other side wall of the car and open above the beds 59 and the storage spaces 62a and 63 of the rooms M to V, inclusive.

At the same end of the car at which the lower room A is located, there is provided an upper room L having an upper stage or raised bed portion 67 which overlies the aisle 18a and also overlies the floor space of room A. Room L is also provided with a lower stage or depressed floor portion 68 which provides floor space ample to accommodate a combination toilet unit 69 and a chair 20. Stairs 70 give access to room L from aisle 18a, and a door 71, conveniently hung on a wall or partition 72, suitably shaped to conform to the aisle and the stairway, cooperates with a wall 73 at the other side of the stairway to provide a closure at the head of the stairs. Room L is further provided with a raised portion 74, of proper height and so located as to provide ample head clearance for persons walking along passage 30, and with a wall 75 extending from portion 74 to the roof of the car. Portion 74 provides a shelf or storage space for baggage and other articles. The depressed floor 68 of room L overlies the fixed section of the bed of the lower room A and the storage space 31. The wall 72 extends across the aisle and from the raised bed portion 67 of room 66 to the roof of the car. This raised portion 67 supports a bed 76 of fixed length.

The upper room V at the other end of the car is provided with an upper stage or raised portion 78 which overlies the floor space and toilet facilities of the underlying lower room K, and with a lower stage or depressed floor space 79 which overlies the fixed section of the bed of room K. This room is also provided with a combination toilet unit 61. Supply pipes 81 and waste pipes 82 extend downwardly from the toilet facilities of the upper rooms or compartments through pipe chase spaces 82a, preferably defined between the walls of the stair wells and the rear sides of the combination toilet units 26 of such lower rooms, so as not to occupy space which could otherwise be utilized for other purposes. It will be noted that the upper toilet units 61 of the upper complementary rooms are superposed almost directly above the lower toilet units 26 of the lower complementary rooms, whereby the same group or nesting of supply and waste pipes serves both upper and lower units. It will also be noted that the illustrated arrangement of the toilet units disposes this group of pipes adjacent to the lengthwise wall 28 of the aisle, whereby convenient access can be had to the shut-off valves in these pipes, for the purpose of making repairs, from the room side of the storage space 25b, or from the aisle 18a through small doors which may be provided in the lengthwise wall 28 or in the side walls 50, 51 of the adjacent stairway. This arrangement of the toilet units and pipes affords concealed plumbing and effects a saving of space.

The space between the top of the bed and the ceiling of each compartment, either upper or lower, is more than sufficient for retiring comfortably, and wherever there is occasion to stand, there is more than sufficient room for that purpose. No more than the standard length and width of sleeping cars now in vogue is required and 31 passengers may be accommodated in the nine double and thirteen single rooms which may be provided in a car of such standard size.

In the form of my invention illustrated in Figures 6A to 10, inclusive, the upper stages or bed portions 48 of the upper rooms are connected, at their inner end portions, to the lower deck 18 by walls 83, the upper portion of each wall being offset inwardly of the bed portion 48, at 84, such upper portion being connected to wall 83 by an inclined portion 85. This offset accommodates the major portion of a wash bowl 86 in the upper compartment, there being a wash bowl 87 in the corresponding lower compartment or room beneath the inclined wall 85 and adjacent a toilet seat 88 in such lower room. A toilet seat 89 is provided in each upper complementary compartment M—V between the upper portion of vertical wall 83 and walls 50 and 51 of the stair well. Suitable walls 90 extend between walls 50 and 51 of the stair well and the adjacent walls 83 and form therewith suitable storage spaces in the nature of closets 91, access to which is had from the aisle 18a, by means of doors 92 suitably mounted on wall 28 and closing door openings therein. Access to the supply and waste pipes 81 and 82 and to the valves therein may be had from the inner side of each lower compartment or from the aisle through doors in the closet walls 90. The chair storage space 25b in each of the lower compartments A to J is in the same relation as in the preceding embodiment, extending transversely inwardly from the fixed bed section 23a and disposed below the lower stage 47 of the upper deck. In the present embodiment the side of the chair storage compartment facing the floor space 25 is partly closed off by the depending portion of the wall 83, which thereby acts as a closure for this storage space. The chair 20 is maneuvered into this space 25b around and under the wash bowl 87 (see compartments C and I) and around and under a notched out portion of wall 83. As shown in Figure 10, the portion of wall 83 extending down from the lower stage 47 of the upper deck has a vertical edge 83' flush with the outer edge of the wash bowl 87 and then is notched out in back of the wash bowl, with its other vertical edge 83" extending down substantially from the inner edge of the wash bowl. The chair is maneuvered into the storage space 25b behind said wall 83 by turning the chair to swing the seat portion thereof under the wash bowl, with the chair arms embracing the bowl, and then swiveling the chair inwardly until it can be pushed back into compartment space 25a. The chair storage space 25b is an important feature in each of the embodiments disclosed because it enables the window seating space 25a which is occupied by the chair during day travel, to be occupied by the movable section 23b of the bed during night travel; also because, through its cooperation with the lengthwise disposal of the extensible bed 23 at the window side of the compartment, a decided saving of space is effected.

In all other respects the construction of the embodiment illustrated in Figures 6A to 10, inclusive, is similar to that of Figures 1A to 5, inclusive. For convenience, the same reference characters are used for analogous parts in the showing of this modification. In the modified form referred to, 31 passengers may be accommodated in the nine double and thirteen single rooms, which may be provided in a car of standard size, as before.

In each of the preceding embodiments the roof structure 101 is preferably of curved cross section, as shown in Figures 4, 5, 9 and 10. Adequate standing room height (in the neighborhood of 6' 6") is afforded between the lower stage 47 of the multiple-stage upper deck and the central portion of the roof structure, and this adequate standing room height extends almost to the side walls of the car. The space in immediate proximity to the windows 64 is only used for sitting space and it is therefore not objectionable if full standing height is not afforded at this point. Referring to Figures 3 and 8, at spaced points along the length of the car there are provided ventilators 103 which communicate through suitable ducts with the upper and lower compartments.

Referring now to the modified embodiment illustrated in Figures 12A, 12B, 13A, 13B, 14, 15 and 16: The embodiment now to be described enables an efficient and compact arrangement of upper and lower compartments to be constructed within the typical body structure of a conventional Pullman car of present day design. As shown in Figures 15 and 16, the roof structure of the conventional Pullman car is of the type commonly referred to as a "monitor" top comprising a substantially flat central portion 108, short vertical side walls 109 and downwardly curved or sloping side portions 111 joining with the vertical side walls of the car body. The space under the central portion 108 is sufficient to afford adequate standing room height in the upper compartments and the space under the downwardly curved side portion 111 at the window side of each upper compartment is used for lengthwise, folding beds. Referring to the plan views of the upper and lower compartments, the lower compartments are designated A, B, C, D, * * * G, H, I, J and K, and the upper compartments are designated L, M, N, O, P, * * * S, T, U and V. The lower compartments are all in complementary pairs from compartments A—B to I—J. End compartment K is practically the same as compartments A, C, E, etc. with the exception that its doorway leading from the aisle is set at an angle and its area of standing room space is slightly smaller in order to accommodate the diagonal passageway 35 at the end of the car. Each of these lower compartments has approximately the same relation of partitions 21 and 22, chair storage spaces 25b and combination toilet units 26, as described of the embodiment of Figures 1A-5. The chair storage spaces 25b are adapted to be closed by folding doors 115, each of which preferably comprises two folding sections hinged to the inner edge of the compartment opening. As shown in Figure 15, the adjacent stairs extend partly over the two adjacent chair storage spaces which are on opposite sides of the partition 21. The lower compartments preferably have lengthwise, folding beds 116 therein, which will be presently described. Linen closets 126 and 127 are provided at opposite ends of the car, between the end compartments and the vestibules.

The upper compartments are all in complementary pairs with the exception of the end compartment L. All of these upper compartments have crosswise beds 59 and lengthwise, extensible beds 60 which are substantially the same as the upper compartment beds 59 and 60 of the preceding embodiments. In the present embodiment the lengthwise beds 60 are disposed under the downwardly curved roof portion 111 along the window side of each upper compartment. By reference to Figure 14, it will be seen that the upper deck in this embodiment has three stage levels, viz., the lower stage levels 47, the upper stage levels 48 and the intermediate stage levels 47a. The extensible beds 60 in the upper compartments are mounted on these intermediate stage levels 47a. As shown in Figures 14-16, the lower stage levels 47 overlie the chair storage spaces 25b and overlie the fixed sections of the lower beds or the adjacent bed storage spaces in substantially the same relation described of the preceding embodiments. This lower stage level 47 provides adequate standing height in the upper compartments under the central portion 108 of the roof structure. The upper stage levels 48 also afford adequate standing height in the lower compartments and in the aisle, the same as in the preceding embodiments, but it will be noted from Figure 16 that in this modified embodiment the upper stage level 48 does not extend over to the side wall 27a of the car but instead terminates at the vertical wall 47b which joins with the intermediate stage level 47a, on which intermediate stage level the upper extensible beds 60 are mounted. This intermediate stage level 47a only overlies the sitting space at the window in each lower compartment and such intermediate stage level affords adequate height for sitting in the chair 20 at said window.

The combination toilet units 26 and 61 in the lower and upper compartments are arranged in approximately the same relation as described of Figures 1A-5. The supply and waste pipes 81 and 82 for both the upper and lower units pass through closed plumbing compartments or pipe chases 131 disposed on each side of each stairway, which compartments have doors 132 opening into the aisle, through which access can be gained to the shut-off valves and the like associated with the pipes 81 and 82.

Referring now to the extensible folding beds 116 in the lower compartments, it will be seen from Figures 14 and 17 that each of these beds comprises a fixed bed section 116a and two folding sections 116b and 116c. The outer end of the fixed section 116a is supported in elevated position above the floor by legs 117, the space 118 beneath this fixed section serving as storage space for baggage and the like. The first folding section 116b is hinged to the fixed section by side pivots 119 which are preferably so arranged that when the sections are in coextensive alignment their upper surfaces will be substantially flush. Such relation may be obtained by disposing the pivots 119 substantially midway of the thickness of the folding section 116b, and by rounding the adjacent upper corners of the frame of section 116b to accommodate this pivot location. Such pivotal relation, together with the provision of the additional folding section 116c, permits the bed to be folded into a short vertical dimension, thereby providing for the baggage storage space 118 and for a low height of the lower stage level 47. The outer folding section 116c is pivotally connected to the swinging end of the inner folding section 116b by pivots 121 which are also arranged that the upper surfaces of these two folding sections will be substantially flush when these sections are in coextensive alignment. All three sections 116a, 116b and 116c have coil springs or other suitable bed springs 122 mounted in the frames of the respective sections. The upper surface of the spring structure may consist of interlaced strips of webbing or an interconnected series of links. When the two sections 116b and 116c are folded outwardly they occupy substantially the entire sitting space at the window 27. The outer section 116c is adapted to rest on supporting shoulders or flanges 122 projecting from the fixed portion of the transverse partition 22. Any suitable latching means 123 may be provided for locking the sections 116b and 116c against folding downwardly at the hinge line 121 when the sections are extended. The reverse side of the section 116b is provided with a suitable panel 124 to present a finished appearance in the room when the bed is closed. The mattress, pillows and blankets are folded into a roll and stored in the bed storage space in advance of the closing of the bed. Any suitable latching means 125 may be provided for locking the section 116b in its raised, folded position.

It will be observed that in all three embodiments herein disclosed the lower and upper compartments have beds extending lengthwise of the car along the window side of their respective compartments. Also, that in these three embodiments such lengthwise beds in both the lower and upper compartments are extensible, viz. in Figures 3 and 8 the beds 23 and 60 are extensible in the sense that the movement of the shiftable bed sections out into the sitting spaces in their respective compartments extends their effective length, and in Figure 14 the beds 60 are extensible in the same way and the beds 116 are extensible in that the folding of the two sections 116b and 116c out into this sitting space extends their effective length. Furthermore, it will be noted that in all three embodiments, the fixed section of the upper bed overlies the space adapted to be occupied by the extensible portion of the lower bed, and the space adapted to be occupied by the extensible portion of the upper bed overlies the fixed section of the lower bed. It will therefore be seen that, although the illustrated arangements of the beds are preferable, my invention is not essentially limited to such arrangements but as illustrative of other arrangements the folding section type of extensible bed 116 might be used in lieu of the shiftable section type of folding bed 23 or 60 in any of these embodiments, or the shiftable section type might be used in lieu of the folding section type in this last described embodiment.

While I have illustrated what I regard to be the preferred embodiments of my invention, nevertheless it will be understood that such are merely exemplary and that numerous modifications and rearrangements may be made therein without departing from the essence of the invention.

I claim:—

1. In a sleeping car, a car body comprising a main floor, right and left side walls and a roof, a lengthwise dividing wall adjacent to said right side wall and defining therewith a side aisle extending along the right side of the car body, a plurality of transverse partitions extending from said lengthwise wall to the left side wall of the car body and defining a series of lower compartments, doors leading from said side aisle into said lower compartments, windows in said left side wall opening into said lower compartments, a multiple stage upper deck extending over said lower compartments, a plurality of transverse partitions extending from side wall to side wall of the car body above said upper deck and defining a series of upper compartments, each of said lower compartments having standing room space therein below the upper stages of said deck and each of said upper compartments having standing room space therein on lower stages of said deck, stairs leading from said side aisle to said upper compartments, windows in said left side wall opening into said upper compartments, extensible beds in a plurality of said lower compartments each comprising a fixed section, and two folding sections, all hingedly connected together and adapted, for night travel, to be extended out to a position lying lengthwise of the car adjacent to the window side of the lower compartment, said fixed section remaining under the adjacent lower stage of said multiple stage deck, and said folding sections adapted, for day travel, to be folded up to a substantially vertical position beneath said lower stage, extensible beds in a plurality of said upper compartments, each comprising a movable section adapted, for night travel, to be extended out into the standing room space of said upper compartment to form a bed lying lengthwise of the car along the left side wall of the car, and adapted, for day travel, to be disposed above an upper stage of said deck, and stationary beds in a plurality of said upper compartments extending transversely of the car and lying on upper stages of said deck.

2. In a sleeping car, a car body comprising a main floor, right and left side walls and a roof, a lengthwise dividing wall adjacent to said right side wall and defining therewith a side aisle extending along the right side of the car body, a plurality of transverse partitions extending from said lengthwise wall to the left side wall of the car body and defining a series of lower compartments, doors leading from said side aisle into said lower compartments, windows in said left side wall opening into said lower compartments, a multiple stage upper deck extending over said lower compartments, a plurality of transverse partitions above said upper deck defining a series of upper compartments, each of said lower compartments having standing room space therein below the upper stages of said deck, and each of said upper compartments having standing room space therein on lower stages of said deck, stairs leading from said side aisle to said upper compartments, windows in said left side wall opening into said upper compartments, extensible beds in a plurality of said lower compartments, each comprising a movable section adapted, for night travel, to be extended out into the standing room space of said lower compartment to form a bed lying lengthwise of the car along the window side of said compartment, and adapted, for day travel, to be disposed below a lower stage of said deck, and extensible beds in a plurality of said upper compartments, each comprising a movable section adapted, for night travel, to be extended out into the standing room space of said upper compartment to form a bed lying lengthwise of the car along the left side wall of the car, and adapted, for day travel, to be disposed above an upper stage of said deck.

3. In a sleeping car, a car body comprising a main floor, right and left side walls and a roof, a lengthwise dividing wall adjacent to said right side wall and defining therewith a side aisle extending along the right side of the car body, a plurality of transverse partitions extending from said lengthwise wall to the left side wall of the car body and defining a series of lower compartments, doors leading from said side aisle into said lower compartments, windows in said left side wall opening into said lower compartments, a multiple stage upper deck extending over said lower compartments, a plurality of transverse partitions above said upper deck defining a series of upper compartments, each of said lower compartments having standing room space therein below the upper stages of said deck, and each of said upper compartments having standing room space therein on lower stages of said deck, stairs leading from said side aisle to said upper compartments, windows in said left side wall opening into said upper compartments, extensible beds in a plurality of said lower compartments each comprising a plurality of sections adapted, for day travel, to be stored below a lower stage of said deck, and adapted, for night travel, to be extended out to form a bed lying lengthwise of the car along the window side of said lower compartment with one of said sections remaining below said lower stage and another of said sections extending out into the standing room space of said lower compartment, and extensible beds in a plurality of said upper compartments each comprising a plurality of sections adapted, for day travel, to be stored above an upper stage of said deck, and adapted, for night travel, to be extended out to form a bed lying lengthwise of the car along the left side wall of the car with one of said sections remaining above said upper stage and another of said sections extending out into the standing room space of said upper compartment.

4. In a sleeping car, a car body comprising a main floor, right and left side walls and a roof, a lengthwise dividing wall adjacent to said right side wall and defining therewith a side aisle extending along the right side of the car body, a plurality of transverse partitions extending from said lengthwise wall to the left side wall of the car body and defining a series of lower compartments, a multiple stage upper deck extending over said lower compartments, a plurality of partitions above said upper deck defining a series of upper compartments, each of said lower compartments having standing room space therein below the upper stages of said deck, and each of said upper compartments having standing room space therein on lower stages of said deck, stairs leading from said side aisle to said upper compartments, extensible beds in a plurality of said lower compartments each comprising a plurality of sections adapted, for day travel, to be stored below a lower stage of said deck, and adapted, for night travel, to be extended out to form a bed lying lengthwise of the car along the left side of said lower compartment, with part of said bed remaining below said lower stage and part of said bed extending out across the standing room space of said lower compartment, extensible beds in a plurality of said upper compartments each comprising a plurality of sections adapted, for day travel, to be stored above an upper stage of said deck, and adapted, for night travel, to be extended out to form a bed lying lengthwise of the car along the left side of said upper compartment with part of said bed remaining above said upper stage and part of said bed extending out across the standing room space of said upper compartment.

5. In a sleeping car, a car body comprising a main floor, right and left side walls and a roof, a lengthwise dividing wall adjacent to said right side wall and defining therewith a side aisle extending along the right side of the car body, a plurality of transverse partitions extending from said lengthwise wall to the left side wall of the car body and defining a series of lower compartments, doors leading from said side aisle into said lower compartments, windows in said left side wall opening into said lower compartments, a multiple stage upper deck extending over said lower compartments, a plurality of transverse partitions extending from side wall to side wall of the car body above said upper deck and defining a series of upper compartments, each of said lower compartments having standing room space therein below the upper stages of said deck, and each of said upper compartments having standing room space therein on lower stages of said deck, stairs leading from said side aisle to said upper compartments, windows in said left side wall opening into said upper compartments, extensible beds in a plurality of said lower compartments each comprising a fixed section, and two folding sections, all hingedly connected together and adapted, for night travel, to be extended out to a position lying lengthwise of the car adjacent to the window side of the lower compartment, said fixed section remaining under the adjacent lower stage of said multiple stage deck, and said folding sections adapted, for day travel, to be folded up to a substantially vertical position beneath said lower stage, chair storage spaces in a plurality of said lower compartments, each defined below a lower stage of said deck and between said extensible bed and said lengthwise wall, each chair storage space being adapted, for night travel, to receive a movable chair which, during day travel, is adapted to occupy window sitting space in the lower compartment, and extensible beds in a plurality of said upper compartments each comprising a plurality of sections adapted, for day travel, to be stored above an upper stage of said deck, and adapted, for night travel, to be extended out to form a bed lying lengthwise of the car along the left side of said upper compartment with one of said sections remaining above said upper stage and another of said sections extending out into the standing room space of said upper compartment.

6. In a sleeping car, a car body comprising a main floor, right and left side walls and a roof, a lengthwise dividing wall adjacent to said right side wall and defining therewith a side aisle extending along the right side of the car body, a plurality of transverse partitions extending from said lengthwise wall to the left side wall of the car body and defining a series of lower compartments, a multiple stage upper deck extending over said lower compartments, a plurality of partitions above said upper deck defining a series of upper compartments, each of said lower compartments having standing room space therein below the upper stages of said deck, and each of said upper compartments having standing room space therein on lower stages of said deck, a bed storage space and a chair storage space in a plurality of said lower compartments below lower stages of said deck, said bed storage space being adjacent to the left side of said lower compartment and said chair storage space being adjacent to the right side thereof, extensible beds in a plurality of said lower compartments each comprising a plurality of sections adapted, for day travel, to be stored within said storage space, and adapted, for night travel, to be extended out to form a bed lying lengthwise of the car with part of said bed remaining in said bed storage space and part of said bed extending out across the standing room space of said lower compartment, said chair storage space being adapted, for night travel, to receive a movable chair which, during day travel, is adapted to occupy window sitting space in the compartment, extensible beds in a plurality of said upper compartments each comprising a plurality of sections adapted, for day travel, to be stored above an upper stage of said deck, and adapted, for night travel, to be extended out to form a bed lying lengthwise of the car with part of said bed remaining above said upper stage and part of said bed extending out across the standing room space of said upper compartment.

7. In a sleeping car, a car body comprising a main floor, right and left side walls and a roof, a lengthwise dividing wall adjacent to said right side wall and defining therewith a side aisle extending along the right side of the car body, a plurality of partitions extending from said lengthwise wall to the left side wall of the car body and defining a series of lower compartments, a multiple stage upper deck extending over said lower compartments, a plurality of partitions above said upper deck defining a series of upper compartments, extensible beds in a plurality of said lower compartments each comprising a plurality of sections adapted, for day travel, to be stored below a lower stage of said deck, and adapted, for night travel, to be extended out to form a bed lying lengthwise of the car, extensible beds in a plurality of said upper compartments each comprising a plurality of sections adapted, for day travel, to be stored above an upper stage of said deck, and adapted, for night travel, to be extended out to form a bed lying lengthwise of the car, and beds in a plurality of said upper compartments extending transversely of the car and lying on upper stages of said deck and having portions thereof extending over said aisle.

8. In a sleeping car, a car body comprising a main floor, right and left side walls and a roof, a lengthwise dividing wall adjacent to said right side wall and defining therewith a side aisle extending along the right side of the car body, a plurality of transverse partitions extending from said lengthwise wall to the left side wall of the car body and defining a series of lower compartments, doors leading from said side aisle into said lower compartments, windows in said left side wall opening into said lower compartments, a multiple stage upper deck extending over said lower compartment, a plurality of transverse partitions extending from side wall to side wall of the car above said upper deck and defining a series of upper compartments, each of said lower compartments having standing room space therein below the upper stages of said deck, and each of said upper compartments having standing room space therein on lower stages of said deck, stairs leading from said side aisle to said upper compartments, windows in said left side wall opening into said upper compartments, beds in a plurality of said lower compartments, and extensible beds in a plurality of said upper compartments each comprising a plurality of sections adapted, for day travel, to be stored above an upper stage of said deck, and adapted, for night travel, to be extended out to form a bed lying lengthwise of the car along the left side of said upper compartment, with part of said bed remaining above said upper stage and part of said bed extending out across the standing room space of said upper compartment.

9. In a sleeping car, a car body comprising a main floor, right and left side walls and a roof, a lengthwise dividing wall adjacent to said right side wall and defining therewith a side aisle extending along the right side of the car body, a plurality of transverse partitions extending from said lengthwise wall to the left side wall of the car body and defining a series of lower compartments, doors leading from said side aisle into said lower compartments, windows in said left side wall opening into said lower compartments, a multiple stage upper deck extending over said lower compartments and comprising substantially vertical and horizontal walls all permanently stationary, a plurality of transverse partitions above said upper deck defining a series of upper compartments, each of said lower compartments having standing room space therein below the upper stages of said deck, and each of said upper compartments having standing room space therein on lower stages of said deck, stairs leading from said side aisle to said upper compartments, windows in said left side wall opening into said upper compartments, a plurality of said upper compartments accommodating a movable chair therein adapted to occupy sitting space at the window of said upper compartment, beds in a plurality of said lower compartments, and extensible beds in a plurality of said upper compartments each comprising a plurality of sections adapted, for day travel, to be stored above an upper stage of said deck, and adapted, for night travel to be extended out to form a bed lying lengthwise of the car along the left side wall of the car, with part of said bed remaining above said upper stage and part of said bed extending out across the window sitting space of said upper compartment, the latter part of said bed, when thus extended, being at a sufficient height to accommodate the storage of said chair under said bed.

10. In a sleeping car, a car body comprising a main floor, right and left side walls and a roof, a lengthwise dividing wall adjacent to said right side wall and defining therewith a side aisle extending along the right side of the car body, a plurality of transverse partitions extending from said lengthwise wall to the left side wall of the car body and defining a series of lower compartments, a multiple stage upper deck extending over said lower compartments, partitions above said upper deck defining a series of upper compartments, each of said lower compartments having standing room space therein below the upper stages of said deck, and each of said upper compartments having standing room space therein on lower stages of said deck, stair wells leading from said aisle to said upper compartments, extensible beds in a plurality of said lower compartments, each comprising a movable section adapted, for night travel, to be extended out into the standing room space of said lower compartments to form a bed lying lengthwise of the car, and adapted, for day travel to be disposed below a lower stage of said deck, extensible beds in a plurality of said upper compartments, each comprising a movable section adapted, for night travel, to be extended out into the standing room space of said upper compartment to form a bed lying lengthwise of the car, and adapted, for day travel, to be disposed above an upper stage of said deck, the bed in each upper compartment, when extended, lying over the bed in the associated lower compartment, and toilet fixtures in said upper compartments on opposite sides of the stair wells and positioned to the right side of said upper compartments from said extensible beds.

11. In a sleeping car of the class described, a body comprising a main floor divided into an aisle and lower compartments, a multiple stage deck extending over said lower compartments and comprising substantially vertical and horizontal walls all permanently stationary, means defining upper compartments above said deck, bed sections in a plurality of said lower compartments movable for night travel into the standing room spaces of said lower compartments and movable for day travel into bed storage spaces under the lower stages of said deck, and bed sections in a plurality of said upper compartments movable for night travel into the standing room spaces of said upper compartments and movable for day travel into bed storage spaces on the upper stages of said deck.

ARTHUR H. WOODWARD.